United States Patent [19]

Augsburger et al.

[11] Patent Number: 5,053,654

[45] Date of Patent: Oct. 1, 1991

[54] DEVICE FOR OPERATING MAGNETIC LEVITATION SYSTEMS

[75] Inventors: Friedemann Augsburger; Gerhard Holzinger, both of München; Friedrich Löser, Riemerling; Hermann Von Kuepach, Landshut, all of Fed. Rep. of Germany

[73] Assignee: Thyssen Industrie AG, Essen, Fed. Rep. of Germany

[21] Appl. No.: 527,123

[22] Filed: May 21, 1990

[30] Foreign Application Priority Data

May 25, 1989 [DE] Fed. Rep. of Germany ....... 3917058

[51] Int. Cl.$^5$ .................. H02K 41/02; B60L 13/06; H02P 7/01
[52] U.S. Cl. .................................. 310/12; 104/282; 104/284; 318/135
[58] Field of Search .................. 310/12; 318/127, 132, 318/135, 687; 104/281, 282, 284, 286

[56] References Cited

U.S. PATENT DOCUMENTS

| 3,895,585 | 7/1975 | Schwärzler | 104/148 LM |
| 3,904,942 | 9/1975 | Holtz | 318/135 |
| 3,912,992 | 10/1975 | Lamb | 318/135 |
| 3,914,669 | 10/1975 | Holtz | 318/135 |
| 4,061,089 | 12/1977 | Sawyer | 104/23 FS |
| 4,068,152 | 1/1978 | Nakamura et al. | 318/135 |
| 4,603,640 | 8/1986 | Miller et al. | 104/282 |
| 4,665,329 | 5/1987 | Raschbichler | 310/13 |
| 4,698,895 | 10/1987 | Miller et al. | 29/464 |
| 4,721,892 | 1/1988 | Nakamura et al. | 318/38 |
| 4,728,382 | 3/1988 | Raschbichler | 156/264 |

FOREIGN PATENT DOCUMENTS 2932764 3/1981 Fed. Rep. of Germany .

OTHER PUBLICATIONS

Thyssen Henschel, New Transportation Technologies, 7/89, The Maglev System.
Raschbichler et al, Neue Verkehrstechnologien-Transrapid-Anwendungsstrecken in der Bundesrepublik Deutschland, 12/89.
Friedrich et al, International Conference on Maglev and Linear Drives, IEEE Catalog No. 87CH2443-0, 5/87, pp. 171-188.
Meins, Jürgen, Energieversorgung des Langstatorantriebs, 1987, pp. 378-381.
Weh, Dr. Ing H., Linear Synchronous Motor Development for Urban and Rapid Transit Systems, 11/79, pp. 1422-1427.

Primary Examiner—Steven L. Stephan
Assistant Examiner—Dennis R. Haszko
Attorney, Agent, or Firm—Michael J. Striker

[57] ABSTRACT

A device for driving a vehicle by magnetic levitation includes a synchronous long-stator motor, with a long stator winding extending along a track of the vehicle and subdivided into a plurality of discrete stator winding sections (3.11 to 3.19; 3.21 to 3.29). The vehicle which is movable on the track supports several fixedly mounted exciters cooperating with the stator winding sections. At least one section cable (17, 28) is arranged parallel to a portion of the track and each of its ends is connected to a power sub-station. The section cable has a plurality of consecutive tap points each being connectable via a switching device to an assigned stator winding section. The switching devices are activated when the vehicle runs over the corresponding winding section. To reduce power losses in the section cable, and also to reduce the number of stator winding sections for a given output power of the sub-stations and also to insure a uniform utilization of the available power over the entire track portion, there are provided control means which adjust the ratio of partial current delivered by the respective power sub-stations as a function of the momentary condition of the vehicle and/or as a function of the ratio of a distance (1) of progressively activated stator winding sections from one of the sub-stations, to the length (d) of the section cable between the two sub-stations.

10 Claims, 7 Drawing Sheets

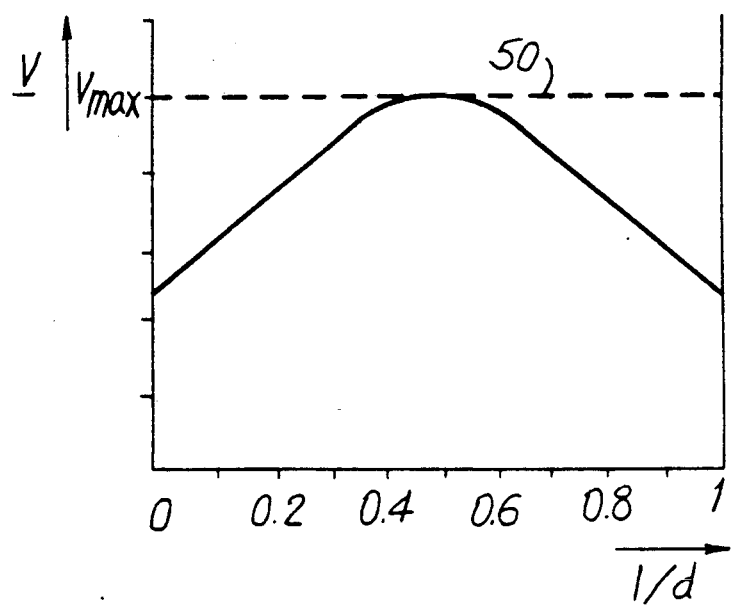
FIG. 7
FIG. 8
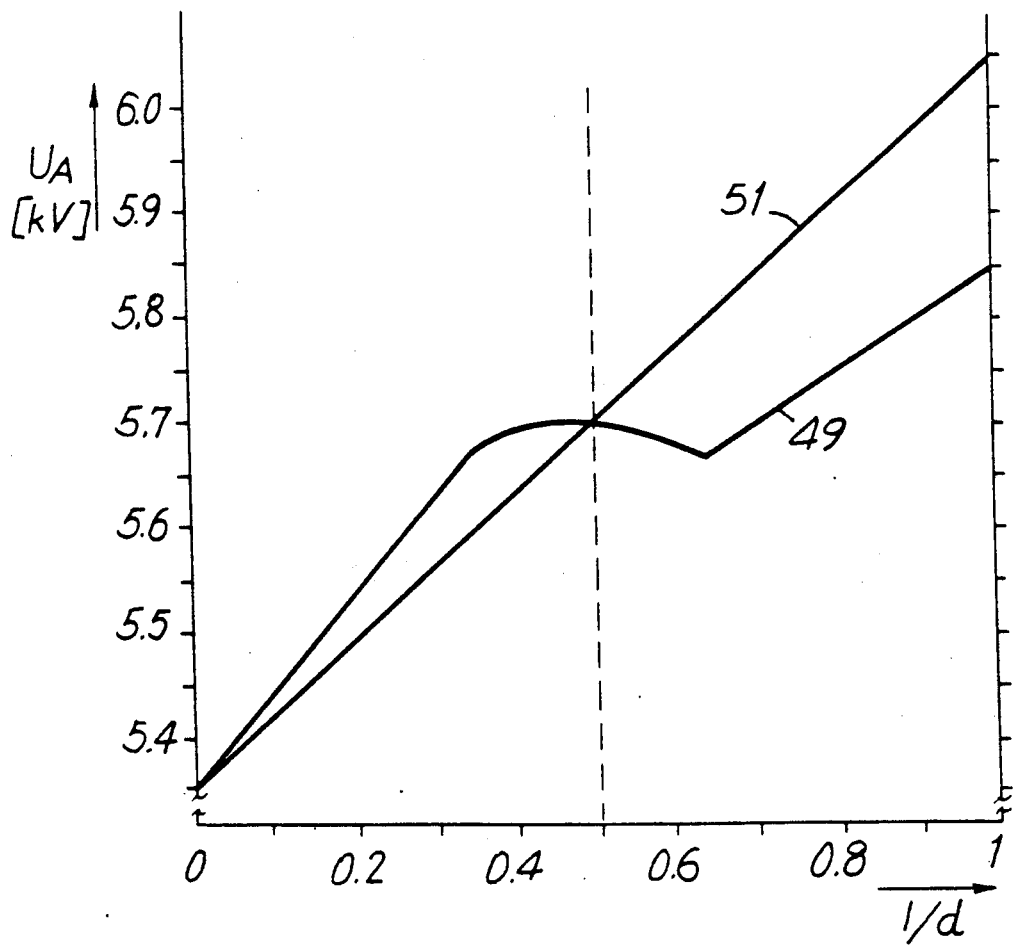

5,053,654

DEVICE FOR OPERATING MAGNETIC LEVITATION SYSTEMS

BACKGROUND OF THE INVENTION

The invention relates to a device for operating a magnetoelectric vehicle, particularly a suspended magnetoelectric vehicle, movable along a track and including a synchronous linear motor, particularly a long stator motor having a long stator winding laid along the track and being subdivided into a plurality of winding sections consecutively connected one to another and an exciter mounted on the vehicle, and further including at least one section cable extending parallel to the track and having a plurality of consecutive tap points, a plurality of switching devices connected between the tap points and connection points of the stator winding sections, and at least two power sub-stations connected to respective ends of the section cable.

In conventional devices of this kind the longstator winding laid along the track is subdivided into a plurality of relatively short, for example 1 kilometer long stator winding sections which are immediately interconnected one after the other. The section cable which is relatively long, for example about 30 kilometers, is connected by one of the switching devices to the stator winding section which at any point in time is being run over by the vehicle (DE-PS 24 25 940). The section cable is connected to a power sub-station in which the requisite DC/AC converters and the like are installed. In order to avoid drop outs of thrusts acting on the suspended vehicle during its passage in the travelling direction over the switching point between the consecutive stator winding sections, a so-called "buck-jump" method is employed. Two section cables are provided and the consecutive stator winding sections are alternatingly connected with one or the other section cable and during the switch-over phase current is supplied to both participating winding sections. Of course, this method requires the use of two independent section cables and the corresponding power sub-stations. If a long stator winding is provided at either side of the vehicle, the same method in principle is employed whereby the stator winding sections at both sides are series connected and jointly switchable to the same section cable. In general, a plurality of consecutive arrangements of this kind must be arranged along the entire track.

To reduce voltage drops occurring across the section cables and to facilitate an emergency operation at a reduced power during a converter failure and the like, another known device of this kind (DE-OS 29 32 764) provides for each section cable two power sub-stations connected to the ends of the cable. Each power sub-station delivers one half of the current which is needed for the generation of a required thrust. In doing so, each of the two sub-stations is used for two consecutive section cables and by means of additional switching devices is switched over to that section cable whose range the vehicle has entered. This so-called double-feeding method can be combined with the above described buck-jump method.

Alternatively, it has been also known (Elektrotechnische Zeitschrift, Volume 108, 1987, Copy 9, pages 378 to 381), to combine the double feeding method with a so-called alternate stepping method. The latter method resides in the separate feeding of respective long stator sides of a double side wound long stator motor by means of two mutually independent power sub-stations, and further in the mutual displacement of the stator winding sections of the right and the left side of the long stator by at least one length of the vehicle. In this manner, in comparison with the buck-jump method, it is possible to reduce power requirements for the installed sub-stations assuming equal operating conditions.

A common feature of all above described known devices is the fact that they do not provide an optimum operation as regards power losses in the section cables, the number of stator winding sections to be laid in a track unit, the utilization of nominal power of respective power sub-stations and the like. It has been found as particularly disadvantageous that the nominal power of the power sub-stations can be utilized to full extent only in those stator winding sections which at the moment of being run over by the vehicle are most distant from the power sub-station.

SUMMARY OF THE INVENTION

It is therefore a general object of the present invention to overcome the aforementioned disadvantages.

In particular, it is an object of the invention to provide an improved device of the above described kind which reduces power losses in the section cables.

An additional object of the invention is to provide such an improved device which for a given nominal power of the sub-stations requires a reduced number of stator winding sections and the associated switching devices.

A further object of the invention is to provide such an improved device which in comparison with prior art guarantees a substantially more uniform utilization of the nominal power of the sub-stations over the entire assigned portion of the track.

In keeping with these objects and others which will become apparent hereafter, one feature of the invention resides in the provision of at least two power sub-stations connected respectively with the ends of a section cable to supply thereto and to the consecutively connectable stator winding sections two partial currents; and means for adjusting the ratio of the two partial currents in dependency on operational conditions of the vehicle and/or on the ratio of the length of the portions of the section cable between the vehicle and the respective power sub-stations.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 7 is a plot diagram of the power loss occurring in the course of the current distribution according to FIG. 6;

FIG. 8 is a plot diagram of the voltage demand for the current distribution according to FIG. 6;

DESCRIPTION OF THE PREFERRED EMBODIMENTS

Figure 1:
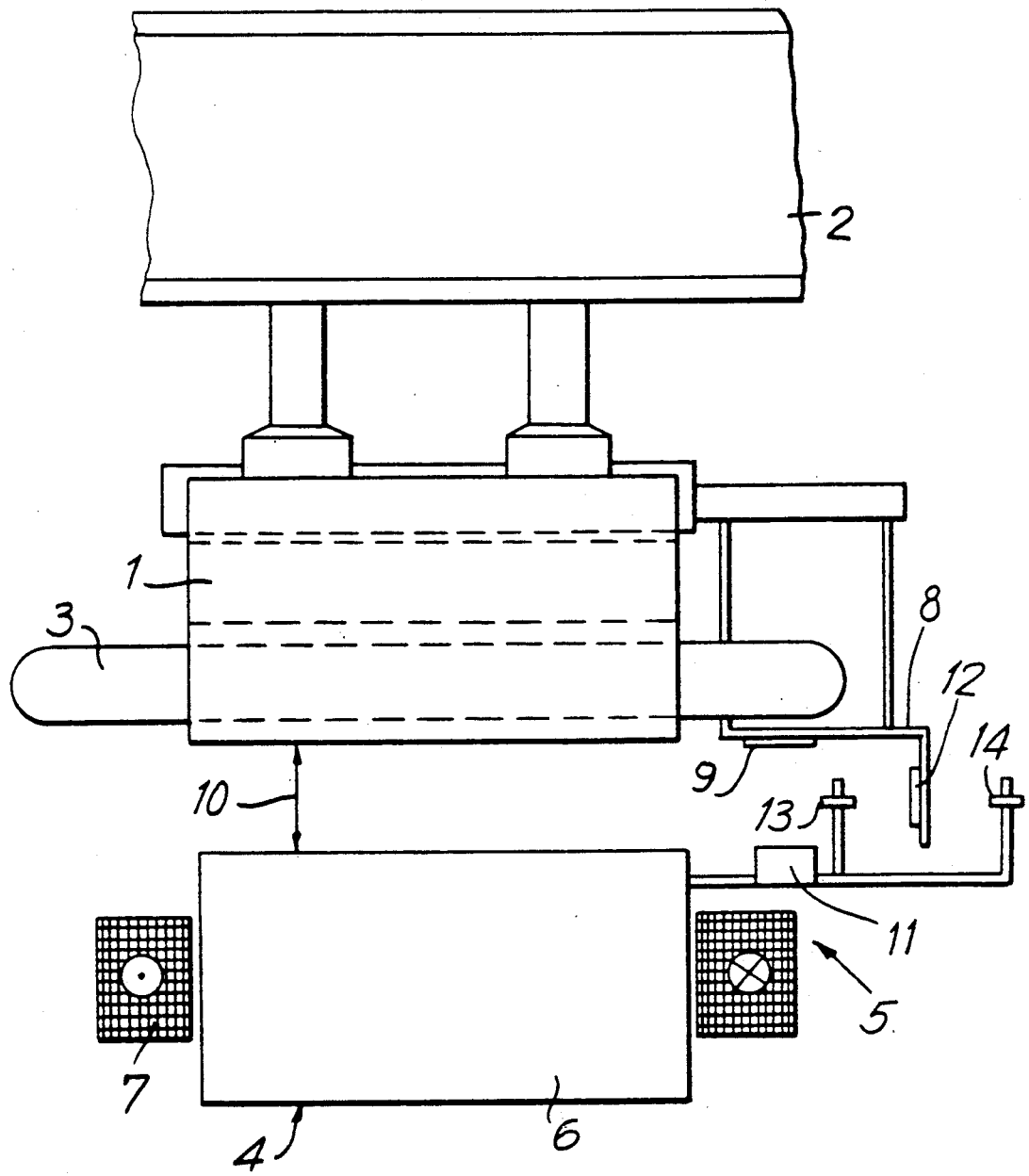
FIG. 1 shows schematically a sectional elevation view of a suspended magnetoelectic vehicle and its track.

Referring to FIG. 1, the illustrated magnetoelectric suspension railway including a synchronous long-stator motor with a pack of stator metal sheets 1 fixedly connected to a track 2 extending along a predetermined route. A long-stator winding 3 in the form of a three phase coil is inserted in grooves of the stator metal sheet pack 1. The long-stator winding is supplied with a three-phase current of a variable amplitude and frequency, whereby as known, a progressive current distribution wave along the long-stator motor is generated. The excitation field of the long-stator synchronous machine is produced by exciters in the form of supporting electromagnets 4 secured to a schematically indicated suspended vehicle 5 to move therewith along the given route. Each of the supporting electromagnets 4 consists of a magnet core 6 and an exciter winding 7. In addition to the magnetic supporting function, the electromagnets 4 provide at the same time the excitation field of the synchronous machine. As a rule, the packs of stator metal sheets 1 with corresponding long stator windings 3 are provided at lateral sides of the track 2 to cooperate with a plurality of electromagnets 4 arranged at lateral sides of the vehicle 5.

To generate the desired forward thrust of the vehicle, it is necessary to synchronize the speed of the vehicle with the propagation velocity of the current distribution wave in the long-stator of the synchronous motor. At a predetermined amplitude of the travelling wave at the fundamental frequency the maximum positive drive or thrust occurs when optimum relative position of the excitation field on the vehicle with respect to the travelling wave is maintained similarly as in the case of a synchronous three phase motor a maximum torque is preserved with an optimum load angle of the magnet wheel. The optimum position of the vehicle relative to the travelling wave is achieved by the frequency regulation in the DC/AC converters in the power sub-stations whereby the instantaneous velocity of the vehicle and the relative position of the supporting magnets 4 to the phase R of the long-stator winding 3 for example are used as reference magnitudes.

To determine this reference magnitude in this example, a measuring strip 8 is provided along the packs of stator metal sheets 1. The measuring strip is arranged at a constant distance from the upper surface of the packs of stator metal sheets 1 and has also a constant correlation or allotment with respect to the long-stator winding 3 in the direction of propagation of the current distribution wave. A continuous metal layer 9 is applied on the measuring strip 8 to serve as a measuring surface for a sensor 11 mounted on the vehicle 5 at a fixed position relative to the pole surface of the magnet core 6 to determine the size of the gap between the opposite pole surfaces of the pack of stator metal sheets 1 and the magnet cores 6. In addition, the measuring strip 8 supports a further metal layer 12 extending at right angles to the metal layer 9 between a transmitter coil 13 and a receiver coil 14 fixedly mounted on the vehicle 5. The additional metal layer 12 has interruptions in the direction of propagation of the current distribution wave. The interruptions have a fixed correlation to the long-stator winding 3 to provide digital information about the relative position of the poles and the absolute position of the vehicle. The information stored on the interrupted measuring surface 12 is picked up by the transmitter and receiver coils 13 and 14 on the vehicle, and processed into signals which indicate the position of the poles, the absolute position of the vehicle and the vehicle speed. These signals together with signals from the sensors 11 which indicate the size of the supporting gap 10 are transmitted for example by a radiowave to the two sub-stations and to a central control network.

Figure 2:
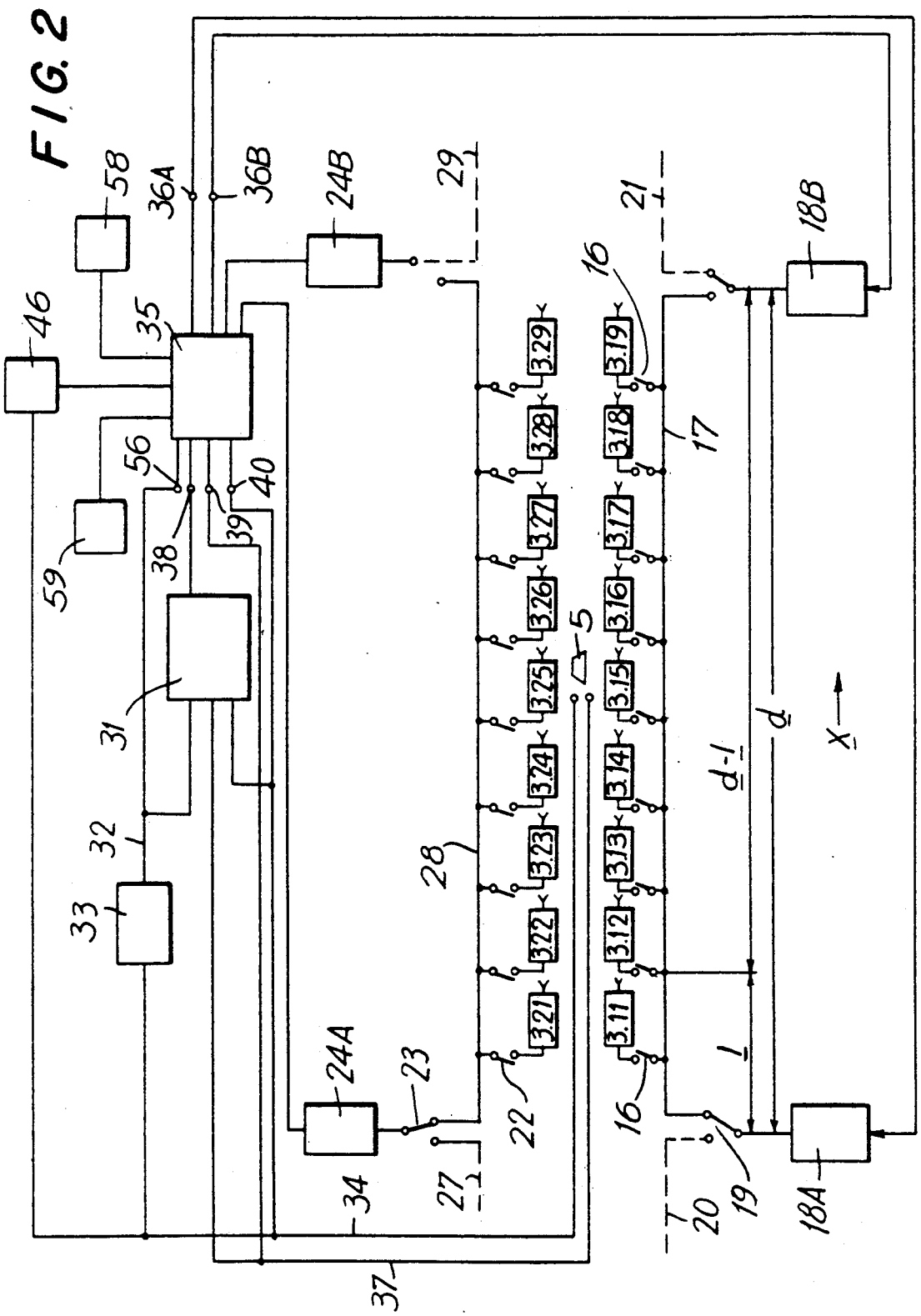
FIG. 2 is a block circuit diagram of a device of this invention for driving suspended magnetovehicles according to FIG. 1.

To minimize the consumption of reactive or idle power and the creation of reactive voltages in the long-stator motor during the travel of the vehicle 5 in the direction of arrow x, only a section of the long-stator winding 3 is activated which is being run over by the vehicle. For this purpose as schematically illustrated in FIG. 2, the long-stator winding 3 is subdivided into a plurality of consecutive stator winding sections 3.11 through 3.19 whose connection points are connectable via switching devices 16 to corresponding taps of a section cable 17. The actuated switching device 16 in the example of FIG. 2 is that assigned to the stator winding section 3.14. The ends of the section cable 17 are connected to power sub-stations 18A and 18B, respectively. Each power sub-station has devices for feeding three-phase current to the consecutive stator winding sections 3.11 through 3.19, particularly a DC/AC converter. The illustrated power sub-stations 18A and 18B can be, by means of additional switching devices 19, connected to further section cables 20 and 21 extending along the track 2. The switchover of devices 19 takes place when the vehicle 5 has not yet reached the section cable 17 between the sub-stations 18A, 18B or before it has left this part of the route.

In practice the long-stator winding 3 has not only the illustrated winding sections 3.11 to 3.19 but also non-illustrated additional phase winding sections connected with individual winding sections 3.11 to 3.19 in a star circuit to provide the conventional three-phase system with phases R, S and T. Since the complete star connections of respective stator winding sections are unnecessary for understanding this invention, they have been deleted from FIG. 2 for the sake of simplicity.

The consecutive stator winding sections 3.11 to 3.19 illustrated in FIG. 2 serve as a rule for driving of one, for example of the right side of the vehicle 5. To drive the opposite, left side of the vehicle, there are provided corresponding stator winding sections 3.21 to 3.29 with corresponding switching devices 22 and 23 for switching over the corresponding tapping points at the section cables 27, 28 and 29 and drive the left side of the vehicle in the same manner as explained above. The stator winding sections 3.11 to 3.19, as schematically indicated in FIG. 2, are displaced relative to stator winding sections 3.21 to 3.29 at least by a length of the vehicle when viewed in the x direction, in order to enable the use of the so-called change-over stepping method. This method provides that respective switching devices 15 or 22 are actuated at the moment when a spacing between two consecutive stator winding sections is situated approximately at the center of the vehicle. The ends of section cables 27, 28 and 29 are connectable to additional power sub-stations 24A and 24B which in practice together with power sub-stations 18A and 18B are combined in sub-station units arranged along the route.

The details of the above described devices and their functions are generally known from prior art (DE-OS 29 32 764, DE-OS 33 03 961, Elektrotechnische Zeitschrift, Volume 108, 1987, Copy 9, pages 378 to 381) and therefore need not be discussed.

Figure 3:
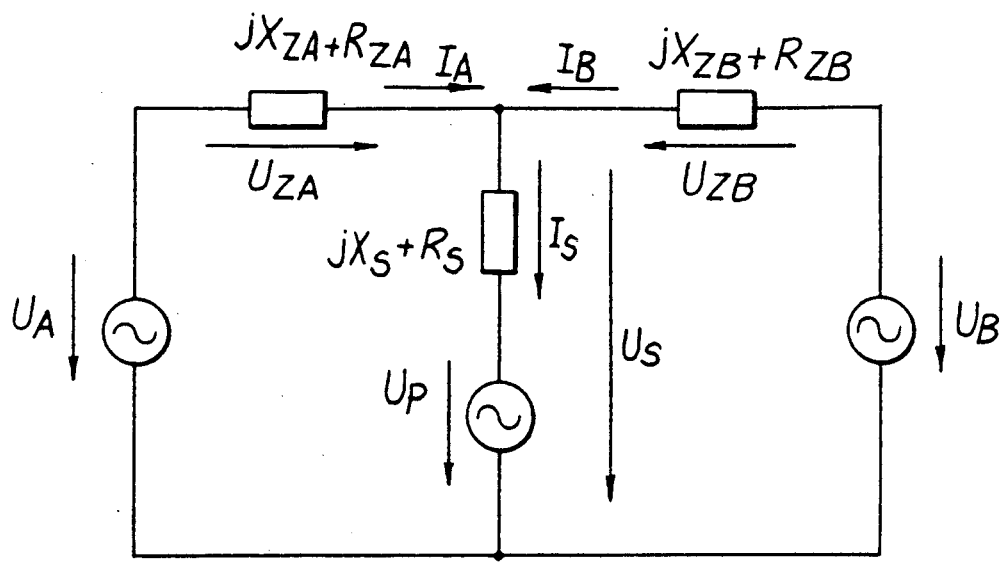
FIG. 3 is an equivalent circuit diagram of a synchronous long-stator motor in the device of FIG. 2.
Figure 4:
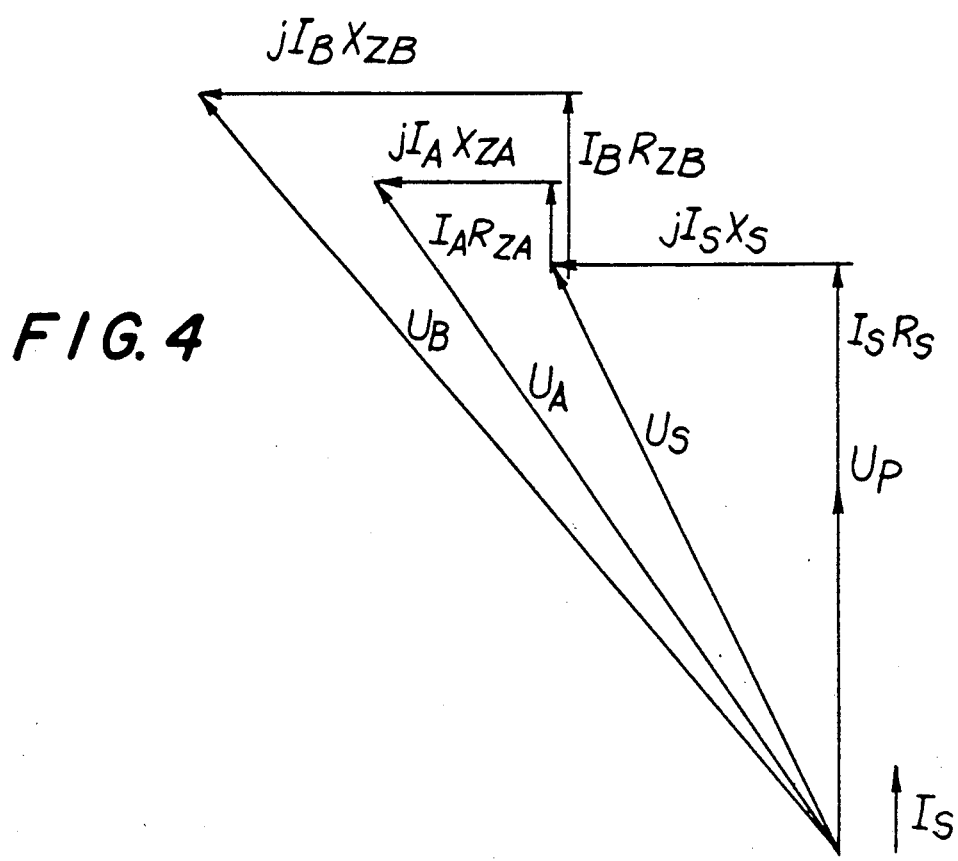
FIG. 4 is a vector diagram of the long-stator motor of FIG. 3.

FIG. 3 illustrates an equivalent circuit of a switched-on stator winding section among the winding sections 3.11 ro 3.19 or 3.21 to 3.29. The current needed for the normal or nominal operation of the vehicle 5 in the switched-on stator winding section to develop the desired normal or nominal speed is indicated by $I_S$, and the load angle voltage depending on the momentary velocity of the vehicle 5 is indicated by $U_P$. $R_S$ and $jX_S$ designate respectively the ohmic resistance and the reactance of the switched-on stator winding section between a tap point of the section cable 17 and the neutral point of the star circuit. The sub-station 18A delivers the partial current $I_A$ and to do so it must generate a voltage $U_A$ which is larger than the load angle voltage $U_P$ in proportion to the ratio of the voltage drop $U_{ZA}$ across the sum of the real or ohmic resistance $R_{ZA}$ and the reactance load $jX_{ZA}$ in the corresponding portion of the section cable 17 conducting the partial current $I_A$, and the voltage drop $U_S$ across the sum of the real resistance $R_S$ and the reactance load $jX_S$ of the entire switched on stator station winding. The values $R_{ZA}$ and $jX_{ZA}$ are valid for the portion of the section cable 17 from the output of the sub-station 18A to the connection point between the actuated stator winding section and the corresponding tapping point on the section cable. The resulting voltages are indicated by means of the vector diagram of FIG. 4. A corresponding representation is valid also for the voltages and partial currents $U_B$ and $I_B$ developed by the second sub-station 18B.

In the prior art devices of this kind both partial currents $I_A$ and $I_B$ are always $0.5.I_S$. In contrast, in the device of this invention, the proportion of the current $I_A$ and $I_B$ is variable according to the position of the momentarily energized stator winding section on the route segment between two power sub-stations 18A, 18B or 24A, 24B. A particularly advantageous current proportioning is obtained when after switching-on a stator winding section, for example the section 3.14, the current $I_A$ from the power sub-station 18A which is closer to the actuated winding section, is larger than the other partial current $I_B$ delivered from the remoter power sub-station 18B. Optimum results are obtained when the two partial currents meet the formula $I=(1-1/d)I_S$, wherein l is the variable distance of the momentarily switched-on stator winding section, for example the stator winding section 3.14 in FIG. 2, from the last power sub-station, in this example from sub-station 18A, and d is the fixed distance between the two sub-stations 18A and 18B corresponding to the total length of the section calbe 17. In practice, l denotes the length of the part of the section cable 17 measured from the output of the starting power sub-station 18A to the momentary tapping point at which a switching device 16 and the assigned stator winding section 3.11 to 3.19 has been actuated, and d is the total length of the section cable 17 between the outputs of the two power sub-stations 18A and 18B. In the example of FIG. 2, the vehicle is travelling in the direction x. Accordingly, if the ratio l/d for the actuated stator winding section 3.14 with respect to the last power sub-station 18A is for example 0.3 and consequently 0.7 with respect to the next power sub-station 18B, then according to the above mentioned formula the partial current $I_A$ has a value of $0.7.I_S$, and the other partial current $I_B$ has the value of $0.3.I_S$. If the real and reactive resistances of the section cable 17 are proportional to its length, as is usually the case, then it results that the voltage drop $U_{ZA}$ (FIGS. 3 and 4) along the part of the section cable 17 leading to the power sub-station 18A equals to the voltage drop $U_{ZB}$ across the part of the section cable leading to the next power sub-station 18B. For all remaining stator winding section the same equation $U_{ZA}=U_{ZB}$ is valid with the special property that the partial currents for a stator winding section at the center of the section cable 17, for example the section 3.15, are equal, that means $I_A=I_B=0.5.I_S$. Consequently, for all stator winding sections $U_A=U_B$.

The application of the formula $I=(1-1/d)I_S$ has the consequence that the feeding of partial current $I_A$ and $I_B$ to an arbitrary stator winding section 3.11 through 3.19 the power loss of the section cable 17 is always minimal for the given normal operating conditions of the vehicle. Accordingly, the total energy consumption is reduced. In addition to the advantage of the reduced power loss in comparison with the prior art symmetrical distribution of supplied currents $I_A=I_B=0.5.I_S$, the invention achieves a substantially reduced maximum voltage at the power sub-station which is more remote from the actuated stator winding section.

The above described adjustment of the current distribution according to the invention is carried by the driving device of FIG. 2. It includes a speed regulator 31 which receives via line 32 a nominal value of speed to be maintained by the vehicle 5 during its travel along the cable 17. The nominal speed values are stored in a store 33 to which a vehicle position signal transmitted by radio from the vehicle 5 is fed via line 34 and depending on the position signal it delivers at its output the nominal speed value for the momentary stator winding section being run over by the vehicle.

The speed regulator 31 delivers at its output a control signal to a current distributing block 35 which in turn adjusts the current $I_S$ to a value needed for achieving the desired or nominal speed. The vehicle position signal from the line 34 is also applied to a track data store 46 whose output is also connected to the current distributing block 35. An output 36A of the current distributing block 35 is connected to the power sub-station 18A and delivers a control signal for adjusting a voltage $U_A$ at the sub-station needed for adjusting the momentary value of the current $I_A$. Corresponding control signals are delivered from the outputs of the current distributing block 35 to the power sub-station 18B (output 36B) and to the power sub-stations 24A and 24B. The actual speed signal determined on the vehicle 5 is transmitted to a line 37 leading to an input of the speed regulator 31 and to an input of the current distributing block 35. The speed regulator compares the actual speed value with the nominal and regulates the current distributing block to adjust the current for maintaining the nominal speed value.

Figure 5:
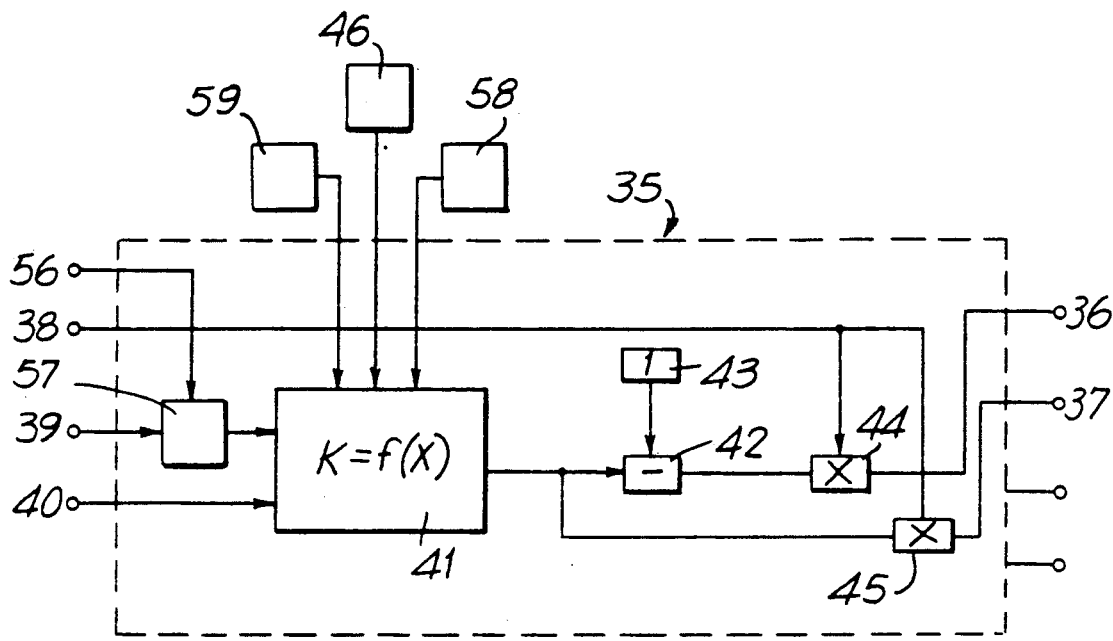
FIG. 5 is a circuit diagram of the current distributing block in the device of FIG. 2.

FIG. 5 shows in more detail the circuit of the current distributing block 35. The input 39 is connected to the line 37 delivering the actual vehicle speed signal, the input 40 is connected to line 34 delivering the vehicle position signal, and the input 38 is connected to the output of the speed regulator 31. The input 40 leads to a processing block 41 which stores a function $K=f(x)$ which determines the current distribution for the normal operation of the vehicle in dependency on its momentary position at which a corresponding stator winding section has been overrun. The function K in this example equals $l/d$, wherein as explained above, l is a variable length and d is the fixed length of a section cable. A position-dependent signal having the value $l/d$ with respect to the left hand power sub-station 18A in FIG. 2, is delivered at the output of the processing block 41 and applied to a subtracting stage 42 where it is substrated from the value "1" stored in the store 43. Accordingly, at the output of the subtractor 42 a value $(1-l/d)$ results. This value is multiplied in a multiplier 44 by a value of the signal delivered from the input 38 and corresponding to the current value $I_S$, and the product is applied to the output 36A. In addition, the value $K=l/d$ is applied directly to a multiplier 45 where it is multiplied by the signal $I_S$ and the product is applied to the output 36B. In this manner, at the output 36A a signal corresponding to $(1-l/d)$ is always available for controlling the sub-station 18A, and at the output 36B a signal corresponding to the value $l/d$ is available for the other sub-station 18B. Corresponding output signals are also delivered to the sub-stations 24A and 24B for energizing the stator winding sections at the opposite side of the vehicle.

Data pertaining to the entire track are stored in a block 46 (FIGS. 2 and 5) whose input is connected to the line 34 and its outputs to the processing block 41. The track data store 46 controls the current distributing block 35 to connect the sub-station 18B with the outputs 37A when the vehicle 5 passes to the next section of the route, for example from the section cable 17 to the section cable 21. At this instant the sub-station 18B is closest to the next stator winding section and the output 36B would deliver its current control signal to the next, remotely situated sub-station. Alternatively, the function $K=f(x)$ can be expressed in the form of a table correlated to each part of the route in such a manner that during the passage of the vehicle 5 to a next route portion the appropriate control signals at the outputs 36A and 36B are immediately delivered from the table.

The application of the formula $I=(1-l/d)I_S$ for the entire route section illustrated in FIG. 2 might cause that during the actuation of a stator winding section which adjoins a power sub-station, for example winding sections 3.11 or 3.19, practically the entire available current $I_S$ from the sub-station must have been delivered. However, this condition is not always desirable because with respect to the partial currents $I_A$ and $I_B$, minimum fluctuations and relatively low maximal current values are preferred to. According to another feature of the present invention, the partial currents $I_A$, $I_B$ are computed according to the formula $I=(1-l/d)I_S$ only for a central region of the respective route sections whereby for the two remaining marginal regions constant partial currents are used which are smaller than $I_S$ and at which the ratio of the partial current delivered from the close power sub-station to the partial current delivered from the remote power sub-station is larger than "1".

Figure 6:
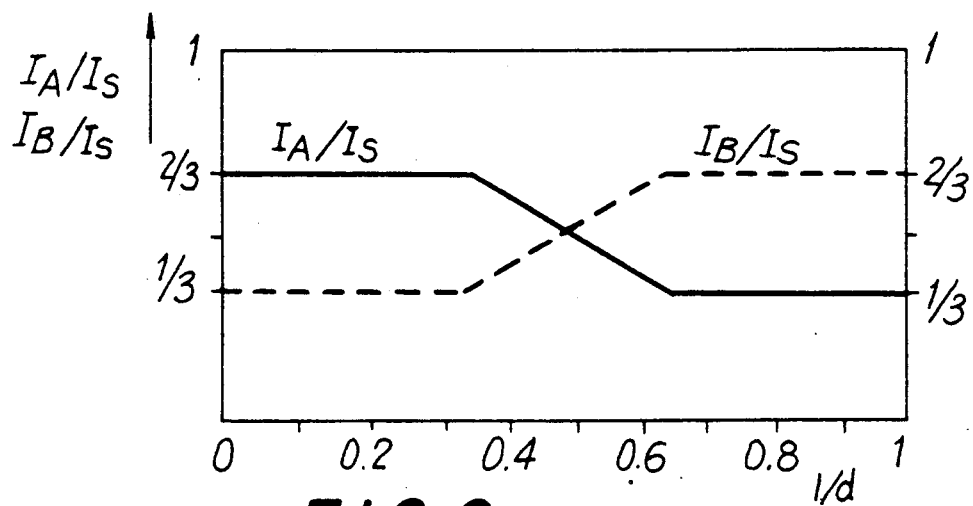
FIG. 6 is a plot diagram of an example of the current distribution in the device of FIG. 2.

This preferred modification of the current distribution is illustrated in the plot diagram of FIG. 6. It will be seen that in this example the value d is again constant total length of section cable 17. By contrast to the preceding embodiment, the variable l affects the ratio of partial current in the central region of $l/d$ values only whereas the partial currents fed to the remaining end regions the stator winding sections remain constant. For example, the partial current $I_A$ delivered by the left hand sub-station 18A has a constant value $\frac{2}{3}.I_S$. In FIG. 2, this constant value of the partial current $I_A$ is applicable to winding sections 3.11 to 3.13. The value of the other partial current $I_B$ delivered by the remote sub-station 18B in this range of winding sections has a constant value $I_B=\frac{1}{3}.I_S$. In a central region of the part of the route corresponding in the example of FIG. 2 to the stator winding sections 3.17 to 3.19, both partial currents $I_A$ and $I_B$ meet the formula $(1-l/d)I_S$. It will be seen that in the range of stator winding sections 3.17 to 3.19 the sub-stations deliver inverse values of the partial currents, that is the sub-station 18B delivers a constant partial current $I_B=\frac{2}{3}.I_S$ and the sub-station 18A delivers constant partial current $I_A=\frac{1}{3}.I_S$. Accordingly, the ratio of the partial current $I_A$ to the partial current $I_B$ in the two marginal sections is 2:1.

Due to the above described modification of the current distribution, the advantages with regards to the reduction of power losses in the section cable 11 and reduced maximal voltage in the power sub-stations 18A and 18B are partially wasted. On the other hand, an advantage is obtained that the partial currents $I_A$ and $I_B$ to be delivered are limited to the value $\frac{2}{3}I_S$. The achievable reduction of power loss V is indicated by characteristic line 48 in FIG. 7 and the achievable reduction of the maximum voltage is indicated by line 49 in FIG. 8, both characteristic lines being related to the symmetrical current distribution $I_A=I_B=0.5.I_S$ indicated by lines 50 and 51 under equal conditions. The ordinate in the plot of FIG. 7 indicates the power loss V and the ordinate in the plot of FIG. 8 indicates the maximum voltage $U_A$ available in the sub-station 18A. The abscissas in the plots indicate the ratio $l/d$, wherein l is the distance of the momentarily actuated stator winding section from the starting or last sub-station 18A. As to the voltage $U_B$ of the next or right hand sub-station 18B it has the course corresponding to the line 49 depending on the position of the respective winding sections.

The smaller values of the maximum voltage, for example 5.84 kV instead of 6.05 kV at the remote or next power sub-station are utilized in the device of this invention for extending or prolongating the individual stator winding sections 3.11 to 3.19 and 3.21 to 3.29 in the travel direction x. As a consequence, less stator winding sections and less switching devices 16 or 22 are needed for a route sector which in the case of long tracks leads to substantial saving on material and maintenance.

In a preferred embodiment of this invention which hitherto has been found as most advantageous the length of the stator winding sections outside the central range of the route section covered by the section cable, for example the winding sections 3.11 to 3.13 and 3.17 to 3.19 are optimized in such a manner that the sum of their respective nominal load angle voltage, the voltage drop across their ohmic resistance $R_S$ and reactance $jX_S$ and the voltage drop across the ohmic resistance $R_Z$ and reactance $jX_Z$ of the corresponding portion of the section cable 17 leading to the remote power sub-station, is made constant and independent of the position x of the stator winding section under consideration. In the example of the sub-station 18A in FIG. 2 this means that the length of the winding sections 3.17 and 3.19 and preferably also of the winding sections 3.14 to 3.16 are dimensioned such that for producing partial currents $I_A$ designed for these sections, a voltage $U_A$ of the same magnitude can be employed whereas for supplying the partial currents $I_A$ into the winding sections 3.11 to 3.13 somewhat smaller voltages $U_A$ will suffice. Corresponding adjustment is used for the remote sub-station 18B which delivers the partial currents $I_B$ to the stator winding sections 3.11 to 3.16 at a substantially constant maximum voltage $U_B$. In this way an optimum utilization of the maximum voltages and maximum currents of these sub-stations is obtained.

Strictly taken, the above described sum of voltages across a winding section is kept constant only then when also the speed of the vehicle or the magnet wheel voltage or load angle voltage $U_P$ is constant. If this is not the case, the above mentioned sum is varied for the highest load angle voltage which occurs in the respective stator winding sections during the normal or nominal operating conditions.

Figure 9A:
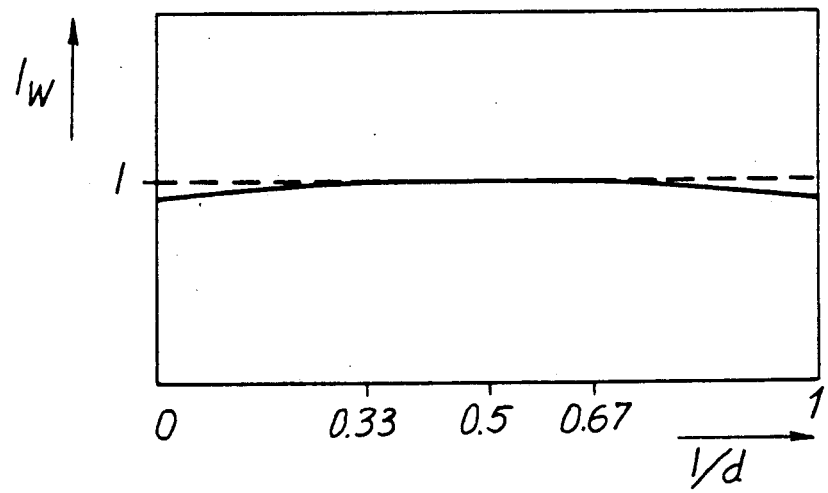
FIGS. 9a, 9b, and 9c show plot diagrams of current and voltage distributions for different ratios of portions of the section cable extending along the track of FIG. 2.
Figure 9B:
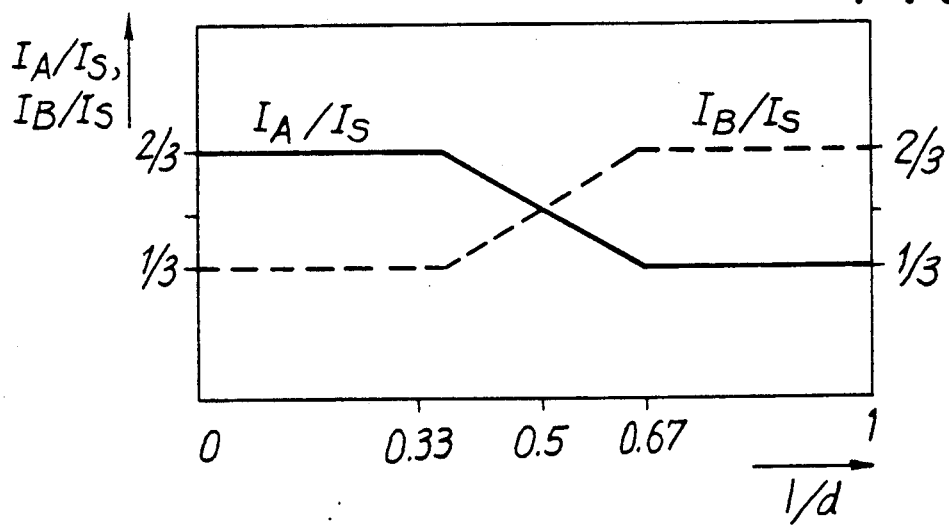
Figure 9C:
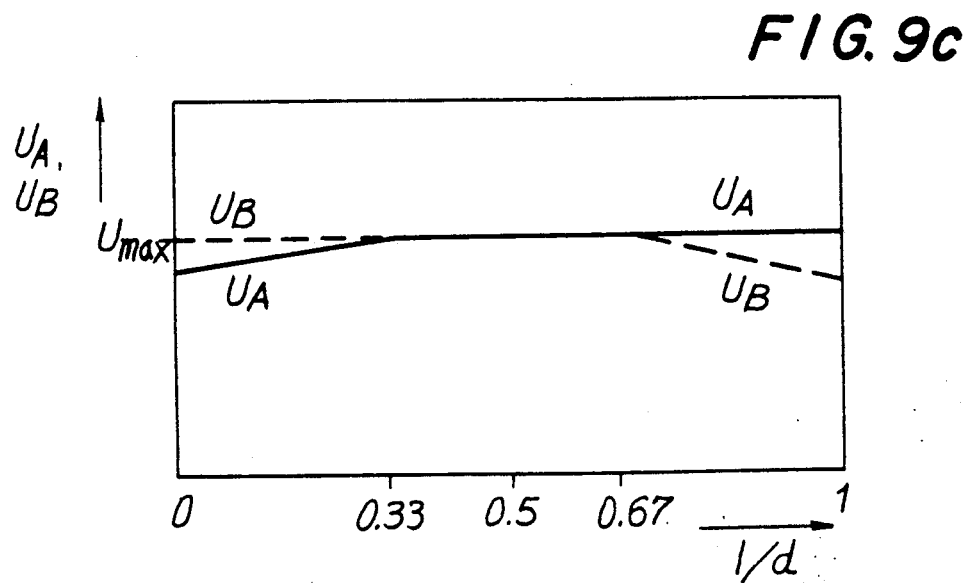

The plot diagrams of FIGS. 9a, 9b, and 9c illustrate the effects of different lengths of the various winding sections 3.11 to 3.19 provided a constant operational situation of the vehicle corresponding to the normal or nominal conditions, that means for travel at a constant speed and for a constant current $I_S$. The actual length $l_W$ of the winding sections over the distance d are determined by the above described optimizing computation.

At the same time the additional plot diagrams in FIG. 9 show the corresponding partial currents $I_A$, $I_B$ and the partial voltages $U_A$, $U_B$ plotted versus the distance $l/d$ of the respective winding sections from the left hand sub-station 18A in FIG. 2.

The DC/AC converters 53 installed in the respective sub-stations 18A, 18B, 24A and 24B are coupled to the ends of section cables 17 or 28 via a transformer having a given transmission ratio. It is necessary to provide converters 53 which are adapted to particular requirements or conditions of different parts of the route and whose power outputs are designed to match operational requirements of different route sections, for example for energizing stable inertia travel at a constant speed on a plane, or an accelerator travel, a travel on ascending terrain and the like. Therefore, conventional devices of this kind use a plurality of different types of converters with different power output arranged along the entire route.

Figure 10:
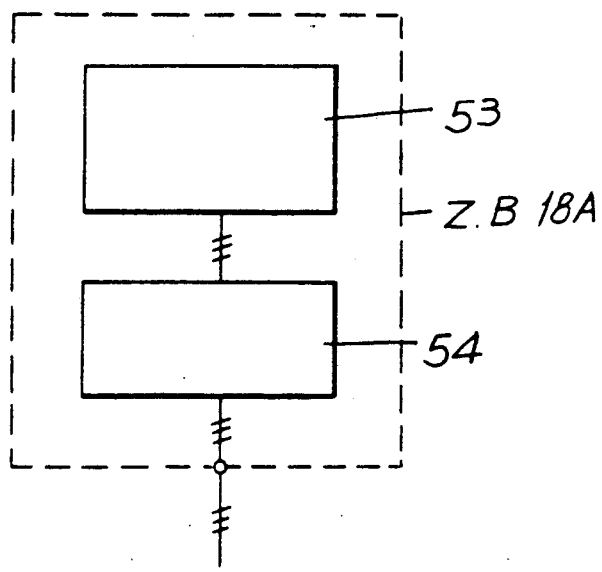
FIG. 10 shows a simplified block circuit diagram of a power sub-station provided with an output transformer.

By contrast, in the device of the invention there are provided substantially uniform DC/AC converters 53 in the sub-stations, for example 18A according to FIG. 10, arranged along the entire track line and only the transmission ratios of the transformers 54 are adjusted to match different operational conditions of the vehicle, thus achieving further saving in construction costs. Of course, in this manner, the devices installed in the sub-stations must have a uniform output power (P=UI) but different maximal voltages and maximal currents can be readily made available as occasion may demand.

Figure 11:
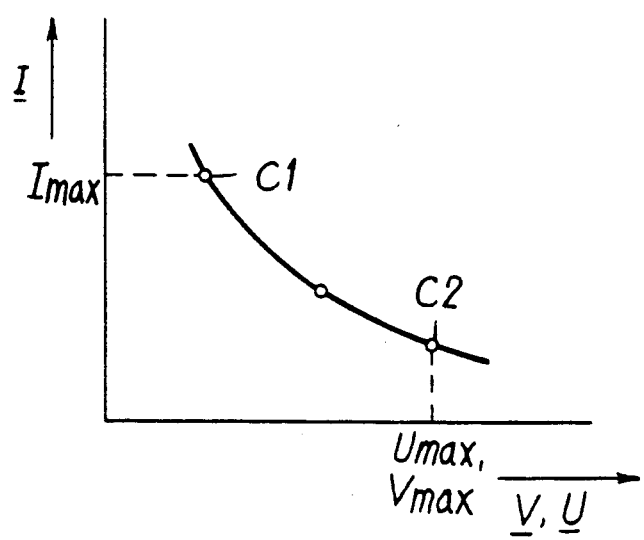
FIG. 11 shows a plot diagram of output current versus voltage or vehicle speed for different transformation ratios of the transformer of FIG. 10.

FIG. 11 shows schematically current values I as a function of voltage I at the output of the transformer 54. The dependency of the current I on the vehicle speed v is the same and therefore need not be illustrated separately. It will be seen that a small transmission ratio of the transformer, for example pertaining to the point C1 of the characteristic in FIG. 11, permits the supply of high currents at a low output voltage. Such a small transmission ratio is provided for example in a section of the route wherein an acceleration from the standstill of the vehicle is expected or an inclined terrain is present. For such acceleration phases generally low maximum voltages will suffice because the velocity of the vehicle and therefore the load angle voltage $U_B$ are also relatively small. In this phase therefore an increased value of the maximum current takes care for the increased thrust required for the acceleration. If later on the vehicle reaches a route section in which a travel at the maximum speed is permissible, then at this section a transformer 54 having a high transmission ratio, corresponding for example to the point C2 in the plot of FIG. 11 is employed because for a drive at a constant high speed the requisite currents $I_S$ are relatively small but due to the large load angle voltages $U_P$ relatively high output voltages at the sub-stations are necessary for the generation of such currents. It is conceivable also to equip the sub-stations with transformers 54 having different transmission ratios, or to subdivide the route sectors into a plurality of sections for which transformers having predetermined transmission ratios are provided in order to meet different operational requirements within this route sector. $I_{max}$ and $U_{max}$ in FIG. 11 indicate current and voltage limits of the employed long-stator systems (winding cables and the like).

By virtue of the position dependent current distribution according to the invention, the advantage is obtained that at least in one of the two sub-stations 18A and 18B reserve current is always available. For example, in the vehicle position dependent distribution of currents and winding lengths according to FIG. 9, the power sub-station which is delivering ⅓ of the current $I_S$ to a stator winding section has theoretically still the capacity to deliver current of ⅔·$I_S$ corresponding to the value of the other partial current. This capability of the device of this invention is utilized for preventing an excessive surge of thrust exerted by vehicle in the case of an unexpected disturbance.

For example if due to an interference or disturbance an entire sub-station, for example the sub-station 18A, is disabled, then according to the invention the above described position dependent current distribution is invalidated and the still operable sub-stations for example 18B, 24A and 24B are induced to deliver simultaneously a maximum possible current so that in the case of contingency the entire nominal power is still available. Of course, this can be attained only after a certain drop of the vehicle speed because the working sub-stations 18B, 24A and 24B operate for these stator winding sections at their maximum voltage limit and therefore are able to deliver a higher current than the momentary nominal current only after the vehicle speed and thus the load angle voltage $U_B$ have correspondingly decreased. Nevertheless, the speed reduction is markedly smaller than in the case when the three still operative sub-stations 18B, 24A and 24B deliver only 50% of the current $I_S$.

At the breakdown of a complete sub-station there are still about 67% instead of only 50% of the nominal power available for maintaining an emergency operation. The same power conditions are valid when a side of the motor breaks down. For example, if a failure occurs in the side of the motor supplied by sub-stations 24A and 24B in FIG. 2, then the two operative sub-stations 18A and 18B are initiated to deliver, in dependency on the speed reduction of the vehicle, up to about 67% of the total current $I_S$ at this motor side. Consequently, also in this case the surge of thrust is not 50% but only about 33%. Similar considerations are valid also for other failures, so that without regard to the position x of the stator winding section being run over by the vehicle, one of the participating sub-stations is always kept at its current limit or switch-over to the current limit and the other sub-station is operated at its voltage limit or switched over to the voltage limit. If the vehicle is being in an operational condition at which the voltage limit is not reached at any of the participating sub-stations, then independently of the vehicle speed all functioning sub-stations are still capable of delivering their maximum current.

In this manner, in dependency on momentary failure situation, different operational conditions can be established which under given circumstances enable an optimal emergency mode of operation of the vehicle.

To control different sub-stations in the event of a failure, the device of this invention delivers to the input 39 of the current distributing block 35 a signal indicative of the speed of the vehicle 5 and via a further input 56 a signal from the line 32 corresponding to the momentary nominal speed value. The two signals are applied to the control device 57, for example a comparator and the like whose output is connected to an input of the processing block 41. The control device 57 delivers at its output for example a "0" signal when the actual speed corresponds to the nominal speed. If the actual speed is below the nominal speed by a certain threshold value then the control device delivers at its output a "1" signal. If the "0" signal occurs then the block 41 operates in the above described manner. If however "1" signal occurs at its output then in the event of the cancellation of the position dependent current distribution, the block 41 delivers at its output a 0.5 value so that the two participating sub-stations 18A and 18B or 24A and 24B adjust their DC/AC converters such as to deliver equal partial currents $I_A = I_B$. Preferably, command storing blocks 58 and 59 are connected to the processing block 41. Blocks 58 and 59 store data corresponding to predetermined failure situations and also commands which should be carried out in the event of the occurence of a failure situation. In this manner it is made possible to safeguard by means of the control device 57 and by non-illustrated lines leading to the participating sub-stations that an appropriate current distribution for the case of failure is established such as for example $I_A = I_B$ but also that the currents and voltages delivered by the sub-stations are kept, as need be at their limit values or are switched over to these limit values.

A special failure situation is an unscheduled stoppage of the vehicle 5. To introduce an emergency braking needed for such a situation, the two sub-stations 18A and 24A or 18B and 24B are instructed to deliver equal currents $I_A$ and $I_B$ having opposite arithmetic signs than those in the normal operation. As in the other above described failure situations the feeding of the braking currents is dependent on the momentary speed of the vehicle 5 so that the maximum braking currents $I_A = I_B = -\frac{2}{3}.I_S$ can usually be reached only after the vehicle speed and thus the load angle voltage $U_P$ have been correspondingly reduced. Inversely, in acceleration phase after an emergency stoppage all participating sub-stations are initially fed with the maximum current $I_A = I_B = \frac{2}{3}.I_S$ until the load angle voltage $I_P$ is still sufficiently small. After reaching the normal speed the vehicle position dependent current distribution can be turned on again.

While the invention has been illustrated and described as embodiment in specific examples of the driving device, it is not intended to be limited to the details shown since various modifications and structural changes may be made without departing in any way from the spirit of the present invention. In particular, with respect to the above described vehicle position depending current distribution and winding lengths distribution this can be optimized individually or in block in dependency on particular requirements. Especially the winding lengths distribution according to the invention can be advantageously employed for various stator winding sections where hitherto a double feeding with currents $I_A = I_B = 0.5.I_S$ has been used.

What is claimed as new and desired to be protected by Letters Patent is set forth in the appended claims:

1. A device for driving a magnetoelectric vehicle movable along a track, comprising: a synchronous linear motor having a long-stator winding laid along the track and being subdivided into a plurality of discrete consecutive stator winding sections, and an exciter mounted on the vehicle; at least one section cable extending parallel to the track and having a plurality of consecutive tap points; a plurality of switching devices each being connected between an associated one of the consecutive stator winding sections and an assigned one of said tap points of the section cable to successively connect, if switched on, said stator winding sections to said section cable; at least two power sub-stations connectable respectively with the ends of the section cable to supply two partial currents to a stator winding section connected with said section cable; and means for adjusting the ratio of the two partial currents as a function of the operational conditions of the vehicle and/or of the lengths of the section cable between the connected stator winding section and the sub-stations.

2. A device as defined in claim 1, wherein said vehicle is a magnetic levitation vehicle.

3. A device as defined in claim 1, wherein, when a stator winding section is connected to said section cable, a partial current delivered by a power sub-station which is closer to said connected stator winding section is greater than a partial current delivered by the sub-station which is farther from said connected winding section.

4. A device as defined in claim 1, wherein, when a central stator winding section is connected with said section cable, the partial currents delivered by the two power sub-stations have the same magnitude and are equal to a half of the total current needed for said connected stator winding.

5. A device as defined in claim 1, wherein at least for the normal or nominal operation of the vehicle the two partial currents delivered by the respective power sub-stations are adjusted according to the formula:

$$I = (1 - l/d) I_s$$

wherein d is the length of the cable section between the two power sub-stations, $I_s$ is the total current flowing through a connected one of said stator winding sections and l is the length of a part of the section cable between a power sub-station and said connected one of said stator winding sections.

6. A device as defined in claim 5, wherein the adjusting means adjust partial currents according to the formula only for stator winding sections being connected to a central range of the section cable while for the remaining stator winding sections it adjusts constant partial currents ($I_A$, $I_B$) independent from the lengths of said section cable between said remaining stator winding sections and said sub-stations, wherein said constant partial currents are smaller than the total current ($I_s$), and wherein the ratio of a partial current delivered by a sub-station which is closer to a connected stator winding section, to a partial current delivered by a sub-station which is farther from the same connected stator winding section is greater than 1.

7. A device as defined in claim 6, wherein the ratio is constant and 2:1.

8. A device as defined in claim 1, wherein at least the lengths of the stator winding sections being assigned to the end regions of the section cable are adjusted such that for each of the winding sections in the end regions the sum of the nominal load angle voltage, the voltage drop across its real and reactive resistances and the voltage drop across the part of the section cable extending from a connected one of said winding sections and the farther sub-station, is held substantially constant.

9. A device as defined in claim 1, wherein each of the power sub-stations includes a DC/AC converter connected via a transformer to an assigned end of the section cable, said transformer having an adjustable transmission ratio.

10. A device as defined in claim 1, wherein to each of said at least two power sub-stations a control device is associated, said control device setting, in the case of an operational failure, one of the power sub-stations to a maximum current and the other sub-station to the maximum voltage or both sub-stations to the maximum current.

* * * * *